Dec. 15, 1953 A. MASCHERPA 2,662,417
SPEED CHANGE GEARING
Filed May 1, 1951 3 Sheets-Sheet 1

Inventor
Antonio Mascherpa
By
Munn, Liddy & Glaccum
Attorneys

Dec. 15, 1953  A. MASCHERPA  2,662,417
SPEED CHANGE GEARING

Filed May 1, 1951  3 Sheets-Sheet 2

Inventor
Antonio Mascherpa
By
Munn, Liddy & Glaccum
Attorneys

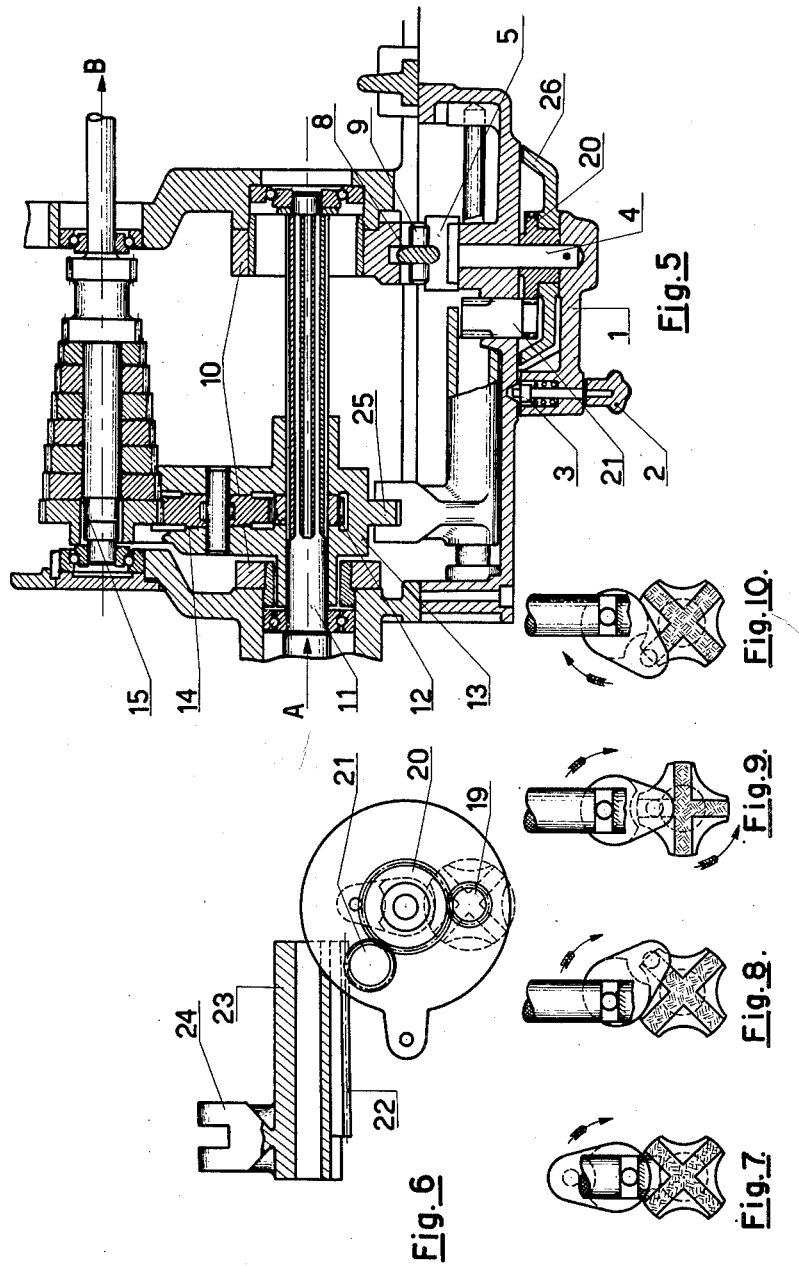

Patented Dec. 15, 1953

2,662,417

UNITED STATES PATENT OFFICE 2,662,417

SPEED CHANGE GEARING

Antonio Mascherpa, Novara, Italy

Application May 1, 1951, Serial No. 223,902

Claims priority, application Italy May 17, 1950

4 Claims. (Cl. 74—352)

In certain machine tools it is necessary to effect speed changes with a stepped gear cone, the gears of which are progressively engaged with a slidable gear.

The principal object of the present invention is to provide a mechanism of the indicated character which prevents extraneous substances such as dust, chips, etc., from getting into the gear box, thereby assuring the proper working condition and operation of the parts, as well as prolonging the life of the parts.

Another object is to obtain changes of speed by imparting to a gear a composite angular and longitudinal or axial movement with respect to the gear cone without requiring an opening in the box of the mechanism.

Another object of this invention is to provide a mechanism of the indicated character with a single control lever and to limit the operation to a single movement of the lever when shifting from one drive ratio into another.

Other objects and advantages of the invention are that it meets the requirements for effectual and efficient stepped gear drives with a wide range of speeds on the output shaft; and to provide a change speed motion transmission mechanism of simplified construction, and in general, to improve the efficiency and convenience of operation.

In the accompanying drawings.

Figure 1:
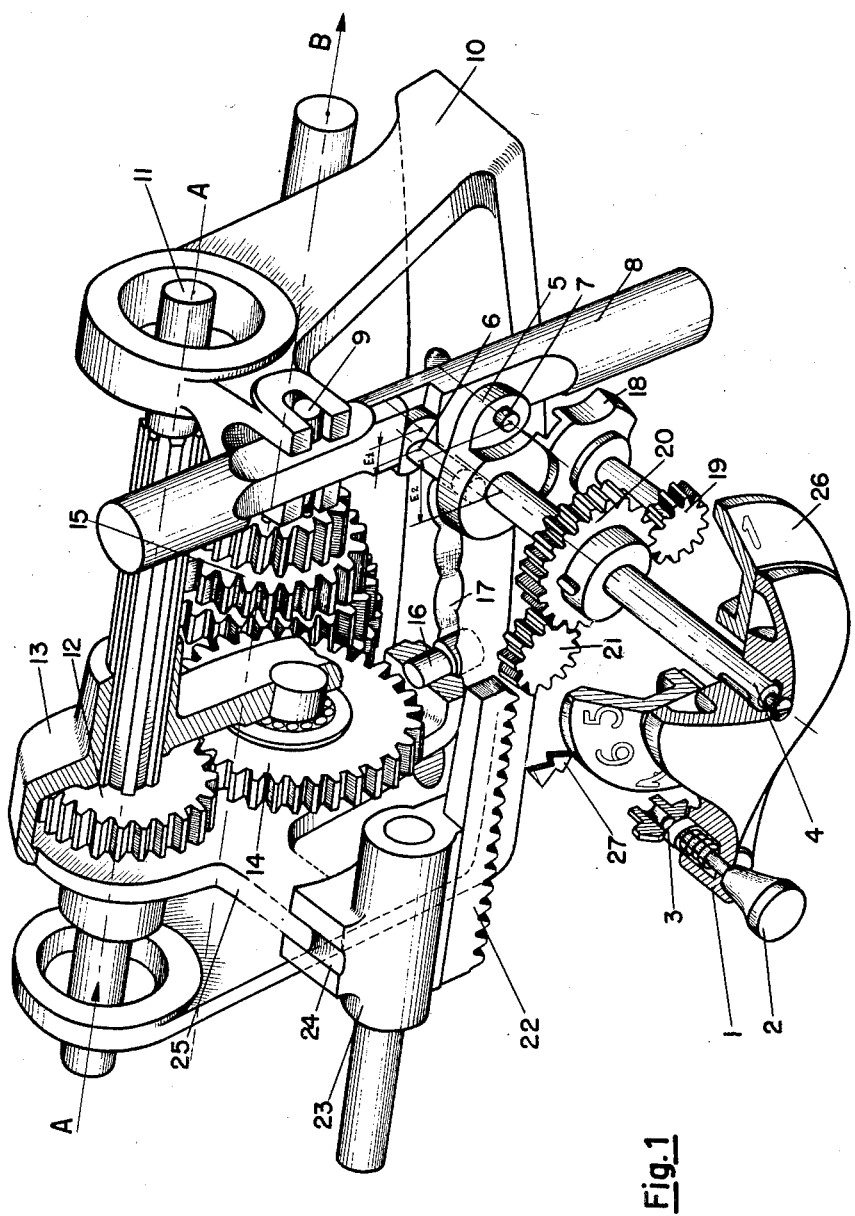
Figure 2:
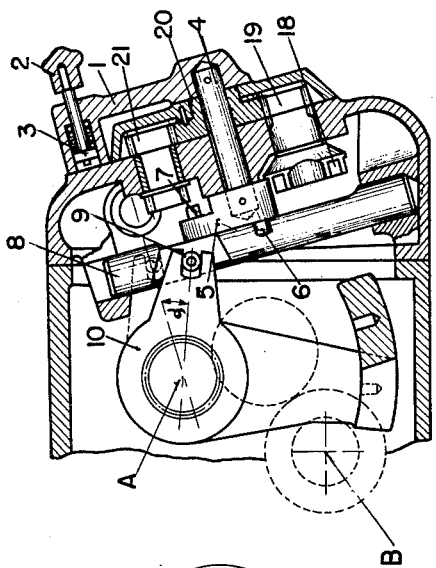
Figure 3:
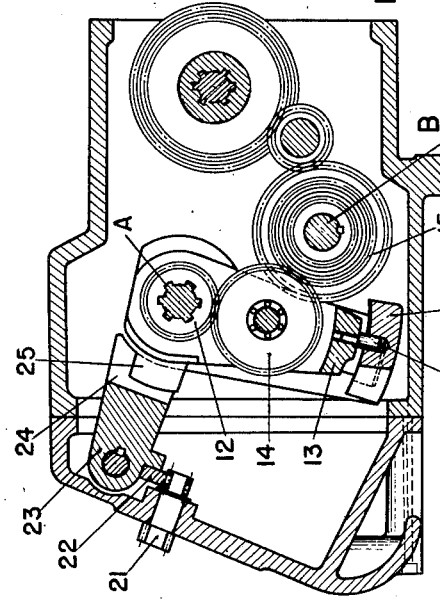
Figure 4:
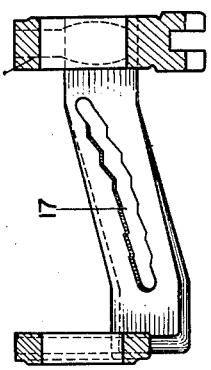

In Fig. 1 is diagrammatically shown the change mechanism, while in Figs. 2, 3, 4, 5 and 6 are shown the various sections and the elements of the said change; and Figs. 7, 8, 9 and 10 show the four different positions of the same elements.

The input movement of the shaft 11 is imparted at A, which rotates the gear 12 and, by way of the laterally movable and rotatably driven gear 14, the movement is transmitted to any one of the gears of the column 15 and leaves at B.

The mechanism of the displacement for the gear 14 for the change of speed takes place as follows: the lever 1 is rotated by handling the knob 2.

On rotating the lever 1, which is rigid with the shaft 4, the hub 5 is rotated, which carries on one side an eccentric pin 7 and on the other side an eccentric pin 6, which pins respectively have eccentricities E1 and E2.

If the lever 1 is in the normal working position, the hub 5 is in the position in which the two eccentrics are on the vertical (Fig. 7), the eccentric 7 at top, the eccenrtic 6 at bottom. If the lever 1 is rotated 135°, and hub 5 is rotated likewise, the pin 6 by reason of the eccentricity E1 lifts the rod 8 a determined amount, which rod 8 by means of the pin 9, oscillates the rocker 10 about the axis A of the shaft 11 on which the fork 13 can slide longitudinally to shift the rotor gear 12 and the gear 14. Said fork has an extension provided with a pin 16, which fits into a profiled groove 17, provided in the base of the aforesaid rocker 10.

If the rocker 10, by reason of the vertical movement of the rod 8 rotates angularly about the axis A, the fork 13 turns angularly, taking the planetary gear 14 away from the meshing position.

By reason of said rotation of the lever 1, the pin 7 enters a groove of the Maltese cross 18 (Fig. 7). If now the angular rotation of the lever 1 is carried on by further 90°, the pin 7 rotates the Maltese cross by 90° (Figs. 9 and 10).

The rotation of the Maltese cross and of the gear 19 rigid therewith, rotates the gear 20, which is loose on the shaft 4 and by means of the intermediaries 21 causes displacement of the rack 22 by a determined amount corresponding to the distance between one gear and the other on the column 15.

The rack 22 is rigid with a hub 23 having a groove 24, in which is fitted slidably the extension 25 of the fork 13. In that way, the longitudinal displacement of the rack causes the longitudinal displacement of the fork 13 and, therefore, of the grive gear 12 and of its gear 14.

The gears 12 and 14 each are shifted into a position to mesh with the next immediate gear to the right or to the left of the one, with which they meshed previously: to the right if the handle was rotated in one direction, to the left if the handle was rotated in the other direction.

On rotating the lever 1 on by a further 135°, the pin 6 takes the rod 8 back to its original position and, therefore, moves the gear 14 to mesh with the gear in the column 15.

It is evident that the meshing position, which the planetary gear must assume progressively as it displaces itself in front of the new gear, depends on the particularly diameter of that gear and, therefore, on the ratios to be obtained with with the change.

In order to obtain those various meshing positions, the rocker 10 has a groove 17, which possesses steps provided in relationship to the various diameters of the various gears.

The consequence is, that as the fork 13 and thus the gear 14 are displaced longitudinally, the angular position thereof is corrected and varied by the position that is being assumed by the pin 16 in the various steps of the groove 17.

Rigid with the gear 20 there is a disc 26, turns an amount proportional to the ratio between the gears 19 and 20. Consequently, each turn of the lever 1 causes the rotation of the disc 26 by a certain amount. Said disc is numbered to indicate, with respect to the pointer 27, the new position attained by the gear 14 and, therefore, to mark the speed ratio attained.

To summarize, it may be said that in the movement of the lever 1 360°, the following operations are performed:

(a) In the first 135° the rocker 10 and the fork 13 as well take the gear 14 away from the meshing position;

(b) In the subsequent 90° the gear 14 is shifted longitudinally one position;

(c) In the further rotation 135°, the gear 14 is taken back to the meshing position.

The groove 17 gives the increment of angular rotation positive or negative for the passage from one particular diameter to another one of the column and, therefore, for the actual meshing.

The disk 26 marks the meshing position obtained and, therefore, the change ratio.

It can be thus clearly seen that for each turn of the lever 1, the gear 14 is shifted into one position or another according to the number of turns performed.

It is possible to turn in the right direction as well as in the left direction. Moreover, the mechanism has characteristics of semi-automaticity and self-warranted safety, because it is impossible to displace the gear 14 longitudinally before taking it away from the meshing position and it is also impossible to have the gear 14 mesh again if it has not reached its new position.

Moreover, the position obtained is clearly indicated externally. The embodiment of such a mechanism permits use of a box for the change completely closed and tight (seal), since the only connection between the lever 1 and the disc 26, which are outside, and the mechanism which is inside, is the shaft 4. The only movement necessary to obtain change of speed, is to rotate the shaft 4. The number of displacements is unlimited in theory, while in practice it is limited only by the possibility of making a rocker of a length confined to practicable limits.

Having now particularly described and ascertained the nature of my said invention and in what manner the same is to be performed, I declare that what I claim is:

1. In a shifting mechanism for stepped gear drives, particularly for machine tools, the combination of a driving shaft, a driving gear slidable on said shaft and having a splined section, a member slidable and oscillatable on said shaft coupled with said splined section, a driven gear mounted on said member and meshing with said driving gear, an output shaft with a stepped gear cone on it, the range of oscillation and slide of said member bringing in contact said driven gear with any gear of said cone, a rocking member guiding the oscillatory motion of said first member, a rack slidable in the direction of said driving shaft provided with extensions meshing with said first member to guide its movement, a rotatable control spindle, means to transform the rotation of said spindle in an alternative swinging of said rocking member, and means operated by the spindle causing the intermittent operation of the rack.

2. In a shifting mechanism for stepped gear drives, particularly for machine tools, the combination of a driving shaft, a driving gear slidable on said shaft and having a splined section, a member slidable and oscillatable on said shaft coupled with said splined section, a driven gear mounted on said member and meshing with said driving gear, an output shaft with a stepped gear cone on it, the range of oscillation and slide of said member bringing in contact said driven gear with any gear of said cone, a rocking member guiding the oscillatory motion of said first member, a rack slidable in the direction of said driving shaft provided with extensions meshing with said first member to guide its movement, a rotatable control spindle, a cam on said spindle, a pin on said cam, a rod engaging said pin and said rocking member to transform circular motion of said cam into oscillating motion of said rocking member.

3. In a shifting mechanism for stepped gear drives, particularly for machine tools, the combination of a driving shaft, a driving gear slidable on said shaft and having a splined section, a member slidable and oscillatable on said shaft coupled with said splined section, a driven gear mounted on said member and meshing with said driving gear, an output shaft with a stepped gear cone on it, the range of oscillation and slide of said member bringing in contact said driven gear with any gear of said cone, a rocking member guiding the oscillatory motion of said first member, a rack slidable in the direction of said driving shaft provided with extensions meshing with said first member to guide its movement, a rotatable control spindle, a cam on said spindle, a pin on said cam, a rod engaging said pin and said rocking member, a second pin on same cam, a Maltese cross engaging said pin and driven thereby in intermittent rotation, a train of gears for transmitting said last motion to said rack, which guides said first member and said driving gear in the direction determined by the direction of rotation of said Maltese cross.

4. In a shifting mechanism for stepped gear drives, particularly for machine tools, the combination of a driving shaft, a driving gear slidable on said shaft and having a splined section, a member slidable and oscillatable on said shaft coupled with said splined section, a driven gear mounted on said member and meshing with said driving gear, an output shaft with a stepped gear cone on it, the range of oscillation and slide of said member bringing in contact said driven gear with any gear of said cone, a rocking member guiding the oscillatory motion of said first member, a rack slidable in the direction of said driving shaft provided with extensions meshing with said first member to guide its movement, a rotatable control spindle, a cam on said spindle, a pin on said cam, a rod engaging said pin and said rocking member, a second pin on same cam, a Maltese cross engaging said pin and driven thereby in intermittent rotation, a train of gears for transmitting said last motion to said rack, said rocking member having a slot in which is movable a roll pivotally engaged with said first slidable and oscillatable member, said slot being shaped so that said driven gear can mesh with any one of the gears of said stepped cone in their reciprocal correct position.

ANTONIO MASCHERPA.

References Cited in the file of this patent

UNITED STATES PATENTS

| Number | Name | Date |
| --- | --- | --- |
| 1,002,455 | Rosenstein | Sept. 5, 1911 |
| 1,084,084 | Guerra | Jan. 13, 1914 |
| 1,753,187 | Grout | Apr. 1, 1930 |
| 2,297,422 | Mobius et al. | Sept. 29, 1942 |
| 2,377,305 | Bickel | June 5, 1945 |
| 2,485,151 | Gorrell | Oct. 18, 1949 |

FOREIGN PATENTS

| Number | Country | Date |
| --- | --- | --- |
| 360,627 | Germany | Oct. 5, 1922 |